(12) United States Patent
Junker

(10) Patent No.: US 6,623,332 B1
(45) Date of Patent: Sep. 23, 2003

(54) GRINDING MACHINE AND METHOD FOR REAL-TIME DIMENSION CONTROL

(75) Inventor: Erwin Junker, Buehl (DE)

(73) Assignee: Erwin Junker Maschinenfabrik GmbH, Nordrach (DE)

( * ) Notice: Subject to any disclaimer, the term of this patent is extended or adjusted under 35 U.S.C. 154(b) by 0 days.

(21) Appl. No.: 09/857,922

(22) PCT Filed: Dec. 9, 1999

(86) PCT No.: PCT/EP99/09703

§ 371 (c)(1),
(2), (4) Date: Jul. 9, 2001

(87) PCT Pub. No.: WO00/35631

PCT Pub. Date: Jun. 22, 2000

(30) Foreign Application Priority Data

Dec. 11, 1998 (DE) .......................................... 198 57 364

(51) Int. Cl.[7] .............................................. B24B 49/00
(52) U.S. Cl. .................................. 451/8; 451/5; 451/65
(58) Field of Search ........................... 451/8, 5, 57, 44, 451/65, 178, 182, 246, 258

(56) References Cited

U.S. PATENT DOCUMENTS

| | | | |
|---|---|---|---|
| 5,239,782 A | * | 8/1993 | Lorenz et al. ............ 51/165 R |
| 5,331,770 A | * | 7/1994 | Ichinohe et al. .......... 51/165.71 |
| 5,347,761 A | | 9/1994 | Murai |
| 5,371,975 A | | 12/1994 | Lundmark |
| 5,761,390 A | * | 6/1998 | Koshishiba et al. .......... 395/85 |
| 5,773,731 A | | 6/1998 | Sakakura et al. |
| 6,332,834 B1 | * | 12/2001 | Nukui et al. .................. 451/57 |

FOREIGN PATENT DOCUMENTS

EP         0562632 A      9/1993

* cited by examiner

Primary Examiner—Lee D. Wilson
(74) Attorney, Agent, or Firm—Jordan and Hamburg LLP

(57) ABSTRACT

A method for controlling the process during rough grinding of a workpiece provides that the workpiece is measured during grinding by a sensor to ascertain an actual size, and the measured actual size is corrected in a continuously automatic manner to attain a predetermined specified size according to grinding time. Additionally, a grinding machine for carrying out the method comprises a grinding wheel for rough grinding a workpiece on a grinding spindle head. The grinding machine also has a sensor for detecting a ground workpiece dimension, and a machine controller. The workpiece is held between a workpiece spindle and a tail spindle. The sensor is arranged primarily in a plane defined by a current contact area of the grinding wheel on the workpiece which rotates, and during rough grinding, the sensor continuously transmits measurement signals to the machine controller. The machine controller controls the grinding wheel based on these signals in such a way that the grinding process can be executed as an in-process, i.e., real-time, control.

22 Claims, 2 Drawing Sheets

GRINDING MACHINE AND METHOD FOR REAL-TIME DIMENSION CONTROL

BACKGROUND

The invention relates to a method and a grinding machine for controlling the process during traverse grinding of a workpiece wherein real-time control is effected.

High accuracies are already achieved with the grinding methods known and used today and with the grinding machines working with these methods. In accordance with a general tendency during manufacture of components in a production process, both monitoring of the process and specific control of the process are necessary in order to reduce a defect rate. If need be, corrective action is already taken during the actual grinding operation in order to achieve a uniformly good quality of the workpiece to be manufactured.

In plunge-cut grinding and swing-frame grinding, in-process-measuring and process-control devices for controlling grinding processes are known. In peripheral traverse grinding, which is also designated as rough grinding, a genuine in-process measuring and process control has hitherto not been realizable because an outside diameter, to be produced during travers grinding, is ground with a traverse stroke and therefore no substantial intermediate steps are recorded via a measuring control in order to then be able to still influence a final value.

During the peripheral traverse grinding process, work has therefore been carried out hitherto only according to the "post-process-measuring and process-control method." This has the disadvantage that the outside diameter already ground, e.g. a fitting seat, can no longer be subsequently corrected on the workpiece being machined if the actual size has already been ground to undersize.

SUMMARY OF THE INVENTION

The object of the invention is therefore to provide a method and a grinding machine, by means of which, during traverse grinding, a diameter can be continuously corrected to a desired diameter to be ground in a reliable manner, which method and grinding machine can be used industrially and in which the measuring method used for in-process-measuring and process-control method or the measuring device used for it require no extension of machining.

The method according to the invention constitutes a method of controlling traverse grinding of a workpiece by means of a grinding wheel on a grinding machine such that a workpiece, during the grinding, is constantly or continuously measured by means of a measuring sensor to determine an existing actual size, and parallel thereto, i.e. simultaneously, the measured actual size is used to automatically and continuously correct grinding to grind the workpiece to a preset grinding-time-dependent desired size. The actual size is corrected to the desired size on the basis of the measured actual size in real-time control of the grinding machine, i.e. in an in-process control. Such a real-time control avoids a situation in which the workpiece to be ground is ground to undersize. As a result, the defect rate during the manufacture of the workpieces can be considerably reduced. Furthermore, the grinding operation can be actively influenced by the real-time control in such a way that heat input introduced into the workpiece by the grinding wheel is reduced or optimized, as a result of which, on the one hand, deformations at the workpiece which are caused by heat and which may likewise lead to inaccuracies of the actual sizes of the workpiece can be reduced, and at the same time the grinding-wheel wear can also be reduced. Optimum grinding conditions can thereby be achieved overall.

The desired size is preferably preset as a time-dependent desired-value curve. In this case, the time-dependent desired-value curve is filed in a storage unit which is preferably an integral part of the machine control. In accordance with the desired-value curve, a correction is then carried out after constant or continuous determination of the respective actual value, so that the grinding wheel approaches the desired-value curve as a function of the grinding time in such a way that the desired final contour on the workpiece is achieved.

In an embodiment of the invention, the actual size is measured directly in a region of engagement of the grinding wheel on the workpiece. The expression "directly in a region of engagement of the grinding wheel" is intended to refer to the fact that a measuring sensor, emitting a measured value in the form of a measuring signal, is arranged essentially in a plane which is defined by an engagement point locus on the rotating workpiece of the grinding wheel. This advantageously achieves the effect that the measurement is effected directly at that point on the workpiece at which the workpiece is just being ground, so that, in the event of the slightest deviations from the desired-value curve, a correction in the direction of the desired-value curve can be carried out immediately via the machine control in order to avoid an undersize cut.

The continuously measured actual size is preferably transmitted as a measuring signal to a machine controller, the correction to the desired size then being effected on the basis of this measuring signal. This corresponds to a real-time control, which is also designated as in-process control. According to the invention, a method in which an in-process control is realized during rough grinding is therefore provided. In accordance with this method according to the invention, the grinding wheel is subsequently corrected to a desired diameter of the workpiece during the grinding.

In accordance with a certain workpiece contour to be ground, the workpiece is ground cylindrically or in a tapered manner at least in one section. That is to say that it is possible, with the method described, to grind both cylindrical and tapered workpieces at their outer contour to a defined desired-value curve with the greatest accuracy.

In order to ensure that the recording of the measured value, on the basis of which the real-time control is effected, always takes place in the region of engagement of the grinding wheel or in the plane formed by the engagement point, rotating on the workpiece, of the grinding wheel, the grinding wheel and measuring sensor are moved in synchronism with one another at the workpiece. In a corresponding manner, it is of course also possible for the grinding wheel and measuring sensor to be fixed and for the workpiece to be moved instead. In this case, too, it is ensured that the grinding wheel and measuring sensor are arranged relative to one another in such a way that the recording of the measured value relates to that point on the workpiece at which the grinding operation is directly taking place. In the method according to the invention, it is not necessary to switch off the machine for the purpose of the measuring operation or to remove the grinding wheel from the workpiece for carrying out the measuring operation.

According to a further aspect of the invention, the grinding machine according to the invention, which serves in particular to carry out the method described above, has a grinding wheel held on a wheelhead and intended for traverse grinding of a workpiece held between a work spindle and a tailstock quill, a measuring sensor for recording a workpiece dimension which has just been ground, and a machine controller. According to the invention, the measuring sensor is arranged essentially in a plane defined by an engagement region on the rotating workpiece, of the grinding wheel, in which case measuring signals can be fed continuously to the machine controller during the traverse grinding. The machine controller in turn, on the basis of these measuring signals, controls the grinding wheel in such a way that the grinding operation can be carried out with real-time control. With the device according to the invention, it is therefore possible to influence the manner of the engagement of the grinding wheel on the workpiece directly during the grinding operation without a time delay, i.e. in real-time control, in such a way that the desired final sizes of the workpiece can be kept within the narrowest possible tolerance range, so that an undersize cut of the workpiece, which as a rule is unacceptable, can be avoided.

In an embodiment of the invention, the measuring sensor is fastened to a measuring head which is attached to the wheelhead in such a way that it can be swung in. Due to the measuring head being attached in such a way that it can be swung in, it can be adapted to various diameters of the workpiece, it always being ensured that the measuring sensor is arranged on the measuring head in such a way that it is always located in the region of the plane defined by the present engagement points of the grinding wheel on the workpiece. According to a preferred embodiment of the invention, the measuring sensor is arranged opposite the engagement region of the grinding wheel on the workpiece, i.e. preferably essentially 180° opposite the engagement region of the grinding wheel. However, it is also possible to arrange the measuring sensor at a certain angular distance at the periphery of the workpiece. With the real-time process control according to the invention, in combination with the machine control on the basis of the recorded actual values, which are used to correct the desired values, it is possible to produce a desired cylindrical form or a desired tapered form of the workpiece. This means that the traverse grinding according to the invention can be used both for cylindrical workpiece forms or workpiece sections and for tapered workpieces or workpiece sections.

BRIEF DESCRIPTION OF THE FIGURES

Further advantages, features and possible uses of the invention will now be explained in more detail with the aid of exemplary embodiments and with reference to the attached drawing, in which.

DETAILED DESCRIPTION

Figure 1:
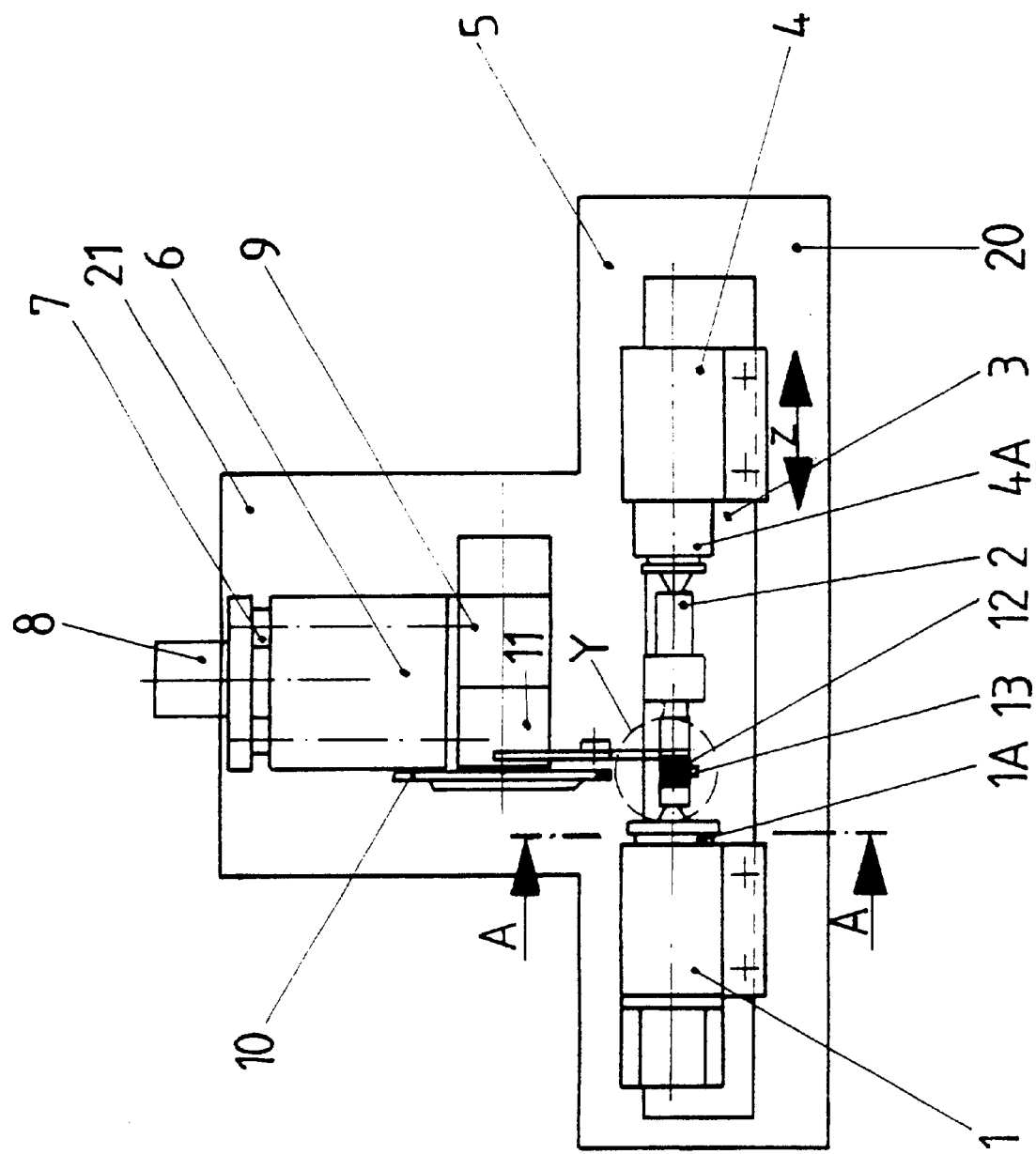
FIG. 1 shows a plan view of a grinding machine according to the invention in a schematic representation, indicating an immediate grinding region Y.

A plan view of an external cylindrical grinding machine which effects a peripheral traverse grinding process is shown in a schematic representation in FIG. 1. CBN grinding wheels, which are thin in the axial direction and have wear-resistant bonds, are used for such a grinding process. A distinctive feature in the case of the grinding process lies in the fact that, as a rule, the complete grinding allowance is removed in one operation in the traverse grinding process. In this case, the radial infeed of a grinding wheel 10 during the grinding is equal to the radial grinding allowance on a workpiece 2. In a manner known per se, an external cylindrical grinding machine has a headstock 1 with a work spindle 1A, a grinding table 3, and a tailstock 4 with a hydraulically displaceable tailstock quill 4A, which are arranged on a machine bed 5. In a front region 20 of the machine bed 5, the grinding table 3 is mounted on guides on which the grinding table 3 is axially traversable in the direction of the CNC axis Z. A motor-operated drive of this axis is not shown. The headstock 1 arranged on the grinding table 3 and the work spindle 1A is motor-driven, the work spindle 1A, in its front region, has a locating center for receiving and transmitting rotary movement to the workpiece 2. The tailstock 4, with the hydraulically displaceable quill 4A, is likewise mounted on the grinding table 3. The quill 4A, in the front region, has a locating center for locating the workpiece 2. The workpiece 2 is mounted between the locating centers of the work spindle 1A and the quill 4A, the center axes of the work spindle 1A and of the tailstock quill 4A and also of the workpiece 2 being oriented exactly in alignment with one another.

Mounted in a rear region 21 of the machine bed 5 is a wheelhead 6, which has hydrostatic guide elements for mounting it. The infeed in the direction of the CNC axis X, which is oriented at right angles to the axis Z, is effected by means of a motor-operated drive 8. In the front region, the housing of the wheelhead 6 carries a grinding spindle 9, on which the grinding wheel 10 is located.

Attached to a housing of the wheelhead 6 is a measuring device 11, which has an arm which serves to accommodate a measuring head 12 for measuring the diameter of the workpiece. One or more measuring sensors 13 for recording the actual diameter of the workpiece directly during the grinding are arranged in the grinding region of the grinding wheel 10 in such a way that the diameter which has just been ground is always being currently measured. As a result, it is possible to record the measured value directly during the machining and to still correct, if necessary, the diameter just about to be ground during the process. This means that, according to this measuring method, a real-time control, i.e. an in-process control, is also made possible for peripheral traverse grinding.

Figure 2:
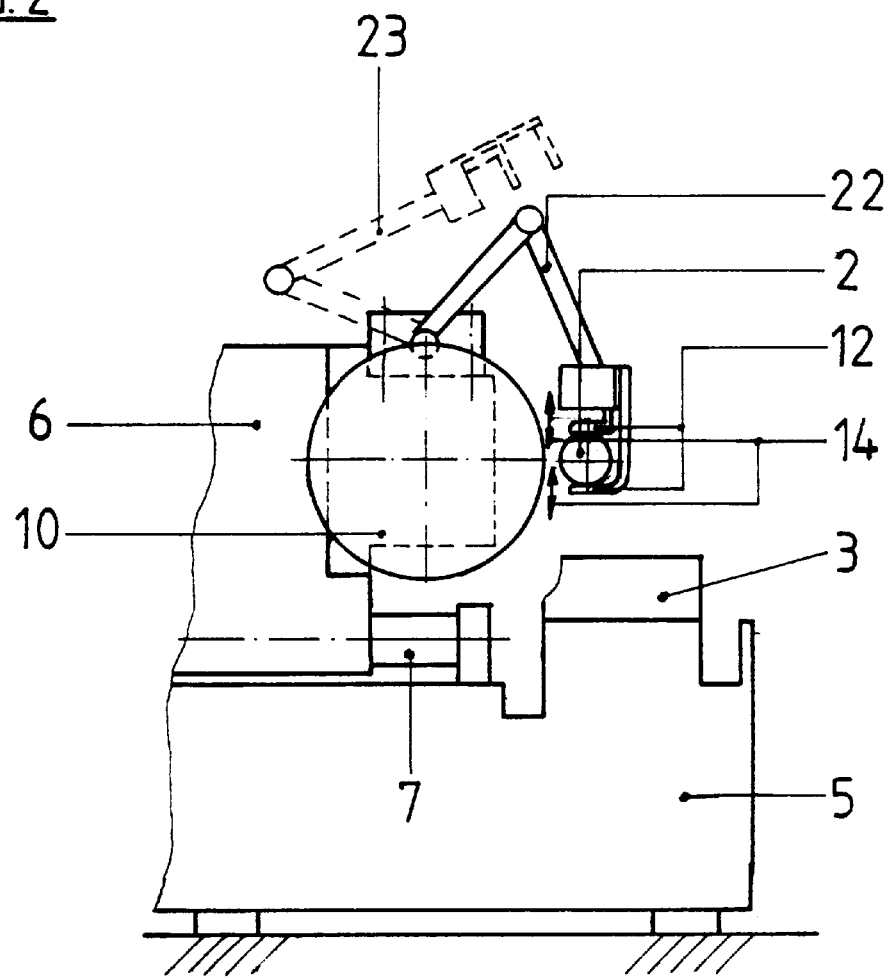
FIG. 2 shows a section along section plane A—A indicated in FIG. 1.

A side view in a diagrammatic representation along section plane A—A from FIG. 1 is shown in FIG. 2. It can be seen from this that a swing-in arm 22, which carries the measuring head 12 having the measuring sensors 13 for recording the diameter of the workpiece 2 to be ground, is mounted on the wheelhead 6. The scannable measuring travel of the measuring sensors 13 is indicated by means of arrows 14. The reference numeral 23 designates the position (shown by broken lines) of the arm 22 in a swung-back or swung-out position. In this swung-back position, the workpiece 2 can be removed from the grinding machine, and a new workpiece can be mounted.

Figure 3:
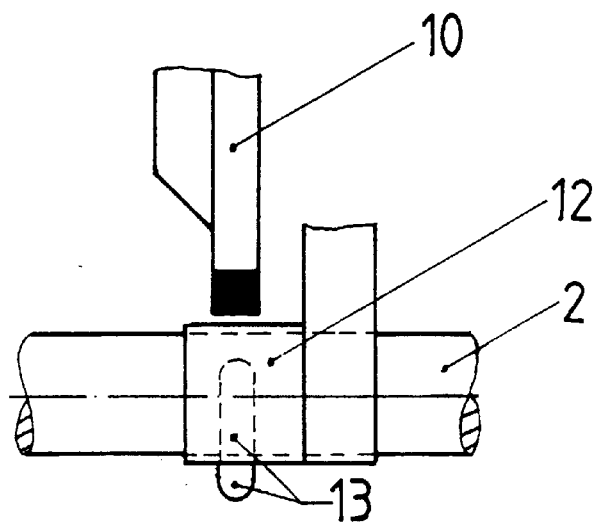
FIG. 3 shows the detail view Y, indicated in FIG. 1, of a grinding region in an enlarged representation.

The detail Y according to FIG. 1 is shown in an enlarged view in FIG. 3. It can be seen from this that the measuring sensors 13 are arranged essentially opposite an immediate engagement region of the grinding wheel 10 on the workpiece 2, the measuring head 12 carrying the respective measuring sensors 13, or the measuring sensor 13 if only one measuring sensor 13 is provided. This ensures that an exact diameter of the workpiece 2 which has just been ground is always measured, and, by a measuring signal corresponding to this measured value being fed to the machine controller, the engagement position of the grinding wheel 10 can be corrected in such a way that the outside diameter of the workpiece, which in particular may be a bearing seat, is corrected to the desired size.

In this case, the measuring sensors 13, with regard to the thickness of the grinding wheel 10, are arranged opposite the latter in such a way that the measured value is sensed directly behind the actual engagement point of the grinding wheel, this engagement point following the wear mark (wear edge) of the grinding wheel. This means that the measured values are sensed on a peripheral line of the grinding wheel opposite the grinding wheel.

The measuring by means of the measuring sensors 13 is effected in this case in such a way that measurements are taken continuously on the workpiece 2 during the infeed of the grinding wheel 10. As soon as the desired size is achieved, the workpiece 2 is traversed with a certain feed in the longitudinal direction in accordance with the traverse grinding process. At the same time, measured values are transmitted continuously to the machine control, so that the workpiece diameter to be ground can be corrected continuously during the grinding. Depending on the design of the device, it is possible to grind both cylindrical and tapered outside diameters on the workpiece 2.

Due to the measuring method according to the invention and grinding machines according to the invention which realize the method, considerably greater process reliability than in the post-process controls known hitherto in the prior art can therefore be achieved during traverse grinding. At the same time, thermal behavior of the grinding wheel and workpiece relative to one another is also optimized, since measurements are always taken during the actual grinding process and the deviations from the desired value can be compensated for directly and immediately.

What is claimed is:

1. A method of peripheral traverse grinding comprising:
   grinding a workpiece by means of a grinding wheel on a grinding machine;
   during the grinding, measuring the workpiece by means of a measuring sensor to determine an actual size; and
   continuously correcting automatically the grinding to a preset grinding-time-dependent desired size based on the measured actual size measured during the grinding thereby effecting real-time correction;
   wherein the actual size is measured directly in a region of engagement of the grinding wheel on the workpiece, and the grinding wheel and the measuring sensor remain in a plane relative to one another during the grinding.

2. The method as claimed in claim 1, wherein the desired size is preset as a time-dependent desired-value curve.

3. The method as claimed in claim 1 or 2, in which the continuously measured actual size is transmitted as a measuring signal to a machine control, on the basis of which measuring signal the correction to the desired size is effected.

4. The method as claimed in claim 1 or 2, in which the grinding wheel is subsequently corrected to a desired diameter of the workpiece during the grinding.

5. The method as claimed in claim 1 or 2, in which the workpiece is ground cylindrically at least in one section.

6. The method as claimed in claim 1 or 2, in which the workpiece is ground in a tapered manner at least in one section.

7. A grinding machine comprising a grinding wheel held on a wheel-head and for peripheral traverse grinding of a workpiece held between a work spindle and a tailstock quill, a measuring sensor for recording a ground workpiece dimension, and a machine control, the measuring sensor, during the grinding, remaining essentially in a plane formed by an engagement region, rotating on the workpiece, of the grinding wheel and continuously delivering measuring signals to the machine control during the peripheral traverse grinding, the machine control in turn, on the basis of these measuring signals, controlling the grinding wheel such that the grinding operation is carried out under real-time control.

8. The grinding machine as claimed in claim 7, in which the measuring sensor is fastened to a measuring head which is arranged on the wheelhead in such a way that it can be swung in.

9. The grinding machine as claimed in claim 7 or 8, in which the measuring sensor is arranged opposite the engagement region of the grinding wheel on the workpiece.

10. The grinding machine as claimed in claim 7 or 8, in which the machine control controls the grinding wheel in such a way that a desired cylindrical form of the workpiece is produced.

11. The grinding machine as claimed in claim 7 or 8, in which the machine control controls the grinding wheel in such a way that a desired tapered form of the workpiece is produced.

12. A method of grinding a workpiece, comprising the steps:
    rotating the workpiece about an axis;
    positioning a grinding wheel radially adjacent the workpiece;
    positioning a sensor for measuring a diameter of the workpiece in a plane defined by a locus of grinding engagement to be made on the workpiece by radial advancement of said grinding wheel into the workpiece to measure the diameter of the workpiece at said locus of grinding engagement during grinding;
    radially advancing said grinding wheel into the workpiece to effect grinding of the workpiece;
    measuring the diameter of the workpiece repeatedly while the grinding of the workpiece is in progress; and
    adjusting positioning of the grinding wheel relative to the workpiece during the grinding in response to measured diameters to effect grinding to a predetermined size for an axial position on the workpiece such that real-time correction and control of the positioning of the grinding wheel is effected.

13. The method as claimed in claim 1, wherein the predetermined size is preset as a time-dependent desired-value curve.

14. The method as claimed in claim 12 wherein the workpiece is ground cylindrically at least in one section.

15. The method as claimed in claim 12, further comprising:
    axially advancing the grinding wheel in an axial direction relative to the workpiece after the advancing of the grinding wheel into the workpiece;
    adjusting positioning of the grinding wheel relative to the workpiece during the grinding and axial advancement in response to the measured diameters to effect grinding to predetermined sizes for axial positions on the workpiece such that real-time correction and control of the positioning of the grinding wheel is effected.

16. The method as claimed in claim 15, wherein said predetermined sizes for axial positions define a tapered contour for the workpiece to be ground to.

17. A grinding machine for grinding a workpiece, comprising:

a grinding wheel;

a workpiece support mechanism rotatably supporting the workpiece about a workpiece axis;

a positioning mechanism for radially positioning said grinding wheel relative to said workpiece to advance said grinding wheel into said workpiece;

a sensor disposed in a plane defined by a locus of grinding engagement to be made on the workpiece by radial advancement of said grinding wheel into the workpiece to measure the diameter of the workpiece at said locus of grinding engagement during grinding; and a controller receiving signals from said sensor to make repeated measurements of the diameter of the workpiece and controlling said positioning mechanism while the grinding of the workpiece is in progress to adjust positioning of the grinding wheel relative to the workpiece during the grinding in response to the measured diameters to effect grinding to a predetermined size for an axial position on the workpiece such that real-time correction and control of the positioning of the grinding wheel is effected.

18. The grinding machine as claimed in claim 17, wherein the grinding wheel is mounted on a wheelhead and the sensor is fastened to a measuring head movably mounted on the wheelhead.

19. The grinding machine as claimed in claim 18, wherein the measuring head pivots on the wheelhead to swing relative the workpiece.

20. The grinding machine as claimed in claim 18 or 19, wherein the sensor is disposed substantially diametrically opposite an engagement region of the grinding wheel on the workpiece.

21. The grinding machine as claimed in claim 18 or 19, wherein the positioning mechanism further axially positions said grinding wheel relative to the workpiece and the controller controls the positioning mechanism to effect grinding of the workpiece to a cylindrical form.

22. The grinding machine as claimed in claim 18 or 19, wherein the positioning mechanism further axially positions said grinding wheel relative to the workpiece and the controller controls the positioning mechanism to effect grinding of the workpiece to a tapered from based on predetermined diameters for axial positions on the workpiece.

* * * * *